United States Patent Office 3,268,468
Patented August 23, 1966

3,268,468
EPOXIDE COMPOSITIONS COMPRISING AN EPOXIDE RESIN, A CURING AGENT FOR SAID RESIN AND A NEUTRAL ESTER OF TRIVALENT PHOSPHORUS ACID HAVING AT LEAST ONE CARBON TO PHOSPHORUS BOND
Henry D. Barnstorff, Glendale, and David H. Chadwick, Webster Groves, Mo., assignors to Monsanto Company, a corporation of Delaware
No Drawing. Filed Feb. 12, 1959, Ser. No. 792,715
20 Claims. (Cl. 260—30.6)

This invention relates to novel resinous compositions of matter and to their preparation. More particularly, it relates to certain epoxide compositions and reaction products and articles and products made therefrom.

Epoxide resins in recent times have come to new heights in fields of application as lamination, surface coatings, adhesives, and electrical potting compounds. In certain applications the technique involved is the addition of curing agent to an epoxide resin, followed by lay-up and curing, either at room temperature or at elevated temperatures. Most of the epoxide resins are solids or extremely viscous liquids at room temperature. In order for the initial composition to have a workable fluid consistency, it is necessary to add some other ingredient so that the viscosity is sufficiently low to permit easy and efficient handling. To obtain such fluidity there may be added non-volatile solvents such as dibutyl phthalate, di-n-octyl phthalate, dioctyl adipate, tricresyl phosphate, methyl acetyl ricinoleate, etc.; however, the incorporation of these substances has various deleterious effects on the cured material. In compositions suitable for use in the electrical field, the incorporation of such materials adversely affects the electrical properties of the cured material.

One of the objects of the present invention is the production of infusible and insoluble reaction products of complex epoxides and curing agents in suitable proportions which have remarkable chemical resistance combined with hardness, toughness, flexibility, lack of contraction on conversion, improved compressive strength, and other desirable properties.

Another object is to provide epoxide compositions which have low initial viscosities and are capable of use as raw materials for the production of such reaction products.

Another object is the production of epoxide compositions for use in making protective coatings, impregnating solutions, adhesives, films, filaments, and the like.

Another object of the invention is the production of molding mixtures and compositions capable of conversion into infusible, molded articles and products, and the articles and products so produced.

Other objects of this invention and the nature and advantages of the invention will appear from the following more detailed description.

In accordance with this invention it has been found that improved epoxide compositions are obtained by incorporating therein a neutral ester of a trivalent phosphorus acid, having at least one carbon to phosphorus bond, hereinafter sometimes referred to for convenience as a "phosphorus acid ester." By the term, "a neutral ester of a trivalent phosphorus acid having at least one carbon to phosphorus bond," is meant esters of a trivalent phosphorus acid generally, having at least one organic radical attached directly to a phosphorus atom, and at least one but no more than two like or unlike divalent chalkogen (oxygen, sulfur, selenium and tellurium) atoms being attached to said phosphorus atom and also to separate organic radicals or to the same organic radical, one of the two chalkogen atoms being optionally attached to a hydrogen atom, e.g. phosphonites, phosphonothioites, phosphonodithioites, phosphinites, phosphinothioites, hydrogen phosphonites, hydrogen phosphonothioites, di- or poly-phosphonites, etc.

Phosphorus acid esters having the following structure:

$$(R)_n—P—(X—R')_{3-n}$$

wherein $n$ is an integer of from 1 to 2, X is a divalent chalkogen atom having an atomic weight of less than 35, i.e. oxygen or sulfur, and R and R' are like or unlike organic radicals, provided that when $n$ is 1 then one R' radical may be a hydrogen atom, represent a preferred class of neutral esters of a trivalent phosphorus acid which are contemplated within the broad scope of this invention. These chemicals are generally known as phosphonites, phosphonothioites, phosphonodithioites, phosphinites and phosphinothioites. The foregoing formula may be broken down into formulas representing the major structures contemplated:

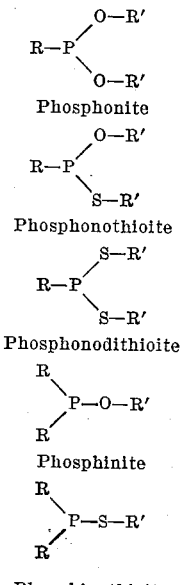

Phosphonite

Phosphonothioite

Phosphonodithioite

Phosphinite

Phosphinothioite wherein R and R' have the same meaning as above. In line with the neutral ester limitation only one of the R' radicals may be a hydrogen atom in the foregoing formulas which contain two ester groups, i.e. phosphonite, phosphonothioite, and phosphonodithioite.

The R and R' radicals can be of the same or different organic radicals, for example, the aromatic radicals may be aryl radicals such as phenyl, tolyl, ethylphenyl, nonylphenyl, decylphenyl, 2,4-dibutylphenyl, 2-methyl-3-ethylphenyl, cymyl, xenyl, naphthyl, and the like, or aralkyl radicals such as benzyl, phenylethyl, phenylpropyl, phenylheptyl, and the like; the aliphatic radicals may be alkyl radicals such as methyl, ethyl, isopropyl, butyl, isoamyl, hexyl, heptyl, 2-ethylhexyl, nonyl, isodecyl, dodecyl, and the like, or alkenyl radicals such as allyl, propenyl, butenyl, pentenyl, and the like; or alkynyl radicals such as propynyl, butynyl, pentynyl, and the like; the alicyclic radicals may be cycloalkyl radicals such as cyclopentyl, cyclohexyl, cycloheptyl, or cycloalkenyl radicals such as cyclopentenyl, cyclohexenyl, cycloheptenyl, and the like; etc.

The aforementioned radicals may be substituted by one or more substituents. Typical, but not limitative of such substituents are the halogens, such as chlorine, bromine, iodine and fluorine; alkoxy groups such as methoxy, ethoxy, propoxy, butoxy, ethoxybutoxy, etc.; one or more hydroxy groups, etc.

It is preferred that the divalent X radical in the above formula be an oxygen atom and that the R and R' radicals be aryl radicals containing from six to fifteen carbon atoms. Phosphonites, i.e. where $n=1$, are preferred over phosphinites and diphenyl phenyl phosphonite is especially preferred.

The phosphorus acid esters of this invention are, for the most part, obtained by the reaction of an appropriate hydroxy compound with a halophosphine, e.g. mono- or dihalophosphine, in the presence or absence of a hydrogen halide acceptor. It is preferred that the hydroxy compound, e.g. the aliphatic alcohol, aromatic alcohol or thiol compound, e.g., aliphatic thioalcohol, aromatic thioalcohol (thiophenol), etc., have an acid dissociation constant ($Ka$) above $1 \times 10^{-13}$, in that especially desirable results are obtained when the (R'—X) moiety of the phosphorus acid ester is derived from a hydroxy or thiol compound having an acid dissociation constant above this value.

Glycidyl polyethers, ethoxyline, epoxy or epoxide resins, as they are variously called, are well known to those skilled in the art.

The epoxide resins useful in the compositions and methods of this invention are those organic compounds containing at least one 1,2-epoxy group, i.e.

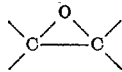

These compounds may be saturated or unsaturated, aliphatic, cycloaliphatic, aromatic or heterocyclic and may contain substituents such as halogen atoms, hydroxyl groups, ether radicals, and the like.

Generally, such epoxide resins comprise a polyether derivative of a polyhydric organic compound, said derivative containing 1,2-epoxy groups and said compound being selected from the group consisting of polyhydric alcohols and phenols containing at least two phenolic hydroxy groups.

Among the polyhydric phenols which may be used in preparing such glycidyl polyethers are the mononuclear phenols such as resorcinol, catechol, hydroquinone, etc., and the polynuclear phenols, such as bis(4-hydroxyphenyl)-2,2-propane, 4,4'-dihydroxybenzophenone, bis(4-hydroxyphenyl)-1,1-ethane, bis(4 - hydroxyphenyl)-1,1-isobutane, bis(4 - hydroxyphenyl)-2,2-butane, bis(4-hydroxy-2-methylphenyl)-2,2-propane, bis(4 - hydroxy-2-tertiary butylphenyl)-2,2-propane, bis(4-hydroxy-2,5-dichlorophenyl)-2,2-propane, 4,4'-dihydroxybiphenyl, 4,4'-dihydroxypentachlorobisphenyl, bis(2-hydroxynaphthyl)-methane, 1,5-dihydroxy naphthalene, phloroglucinol, 1,4-dihydroxynaphthalene, 1,4-bis-(4-hydroxyphenyl) cyclohexane, etc., as well as other complex polyhydric phenols such as pyrogallol, phloroglucinol and novalac resins from the condensation of a phenol with an aldehyde in the presence of an acidic condensation catalyst. For the nature and preparation of novalac resins, see the book by T. S. Carswell, Phenoplasts, 1947, page 29, et seq.

The preferred polynuclear phenol is bis-(4-hydroxyphenyl)-2,2-propane, known in the trade as Bisphenol-A.

In admixture with the named polynuclear phenols, use also may be made of those polynuclear phenols wherein the phenol nucleii are joined by sulfur bridges, as for example, in 4,4'-dihydroxydiphenyl sulfone.

There can also be used 1,2-epoxy containing polyethers of aliphatic polyhydric alcohols, such as the polyglycidyl ethers thereof, as for example the diglycidyl ethers of ethylene glycol, propylene glycol, trimethylene glycol, butylene glycol, diethylene glycol, 4,4'-dihydroxydicyclohexyl triethylene glycol, glycerol, dipropylene glycol, and the like, as well as ethers containing more than two glycidyl groups such as the glycidyl polyethers, glycerol, mannitol, sorbitol, polyallyl alcohol, polyvinyl alcohol, and the like. Such glycidyl polyethers also have a 1,2-epoxy value greater than 1.0.

These epoxide resins, or glycidyl polyethers as they are frequently called, may be prepared by reacting predetermined amounts of at least one polyhydric compound and one epihalohydrin in an alkaline medium.

While it is preferred to use epichlorohydrin as the epihalohydrin in the preparation of the epoxide starting materials of the present invention, other epihalohydrins such as epibrohohydrin may be used advantageously.

In the preparation of the epoxide resins, aqueous alkali is employed to combine with the halogen of the epihalohydrin. The amount of alkali employed should be substantially equivalent to the amount of halogen present and, preferably, should be employed in an amount somewhat in excess thereof. Aqueous mixtures of alkali metal hydroxides, such as potassium hydroxide and lithium hydroxide, may be employed; although for economic reasons, sodium hydroxide is obviously preferred.

The product of the above described reaction instead of being a single simple compound is generally a complex mixture of glycidyl polyethers, but the principal product may be represented by the formula

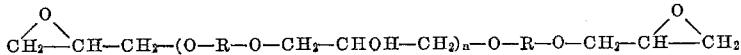

wherein $n$ is an integer of the series 0, 1, 2, 3 . . . and R represents a divalent hydrocarbon radical of a polyhydric compound and preferably a dihydric phenol. While for any single molecule $n$ is an integer, the fact that the obtained polyether is a mixture of compounds causes the determined value for $n$, e.g. from molecular weight measurement, to be an average which is not necessarily a whole number.

The epoxides suitable for use in this invention have a 1,2-epoxy equivalency greater than 1.0. By epoxy equivalency, reference is made to the average number of 1,2-epoxy groups,

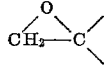

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form so that the epoxy equivalency of these compounds may be quite low and contain fractional values, and therefore the epoxy equivalency of the product is not necessarily an integer such as 2, 3, 4 and the like. The epoxide resin may, for example, have an equivalency of 1.5, 1.8, 2.5 and the like.

Epoxides are disclosed in various places in the art; among the references which may be mentioned are U.S. patents: 2,324,483; 2,444,333; 2,494,295; 2,500,600; 2,503,726; 2,511,913; 2,518,056; 2,558,949; 2,579,698; 2,582,985; 2,592,560; 2,615,007; 2,615,008; and 2,633,458.

Many of the epoxide resins prepared by the above reaction are sold under trade names, as for example Epon resins by Shell Chemical Corp. or ERL resins by Union Carbide Chemicals Company. Data on several types are given in Table I below.

Table I

| Trade Name and Number | Epoxide Equivalent Wt. | Viscosity,[1] 25° C. (Gardner-Holdt) | M.P. ° C., Durran Mercury Method |
|---|---|---|---|
| Epon 815 | 175–210 | 5–9 poises | ([2]) |
| Epon 828 | 175–210 | 50–150 poises | 8–12 |
| ERL-2774 | 185–200 | 105–195 poises | 8–12 |
| Epon 834 | 225–290 | O–V | 20–28 |
| Epon 1001 | 450–525 | C–G | 64–76 |
| Epon 1004 | 870–1,025 | Q–U | 95–105 |
| Epon 1007 | 1,650–2,050 | Y–Z | 125–132 |

[1] The viscosities on Epon 815, Epon 828, and ERL-2774 are on pure resin, Epon 834 on 70% weight solution in butyl Carbitol, and all other types on 40% weight solution in butyl Carbitol.
[2] Liquid.

The preferred polyethers are prepared from bis(4-hydroxyphenyl)-2,2-propane and contain a chain of alternating glyceryl and 2,2-bis(4-phenylene) propane radicals separated by intervening ethereal oxygen atoms and have a 1,2-epoxy equivalency between 1 and 2, an epoxide equivalent weight of about 175 to 600, preferably from about 175 to 370. A particularly suitable material for use in the invention is the normally liquid glycidyl polyether of Bisphenol-A having an epoxide equivalent weight of about 175 to 200 and a 1,2-epoxy equivalency of about 1.8 to 1.95.

Another group of epoxide resins that may be used are those which are derived by the reaction of peracetic acid and unsaturated compounds. A typical member of this class is the epoxide resin derived from butadiene and crotonaldehyde which have undergone the Diels-Alder condensation and the Tishchenko reaction:

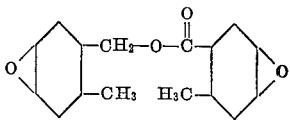

This compound is sold commercially as EP 201.

Still another group of epoxide resins are the polyepoxide polyesters which are prepared by epoxidizing the unsaturated portions of the tetrahydrophthalic residues in the polyester composition. These polyepoxide polyester compositions, as well as their preparation, are described in U.S. Patent No. 2,847,394.

The hardening of epoxide compositions of this invention may be accomplished by the addition of any of the chemical materials known in the art for curing epoxide resins. Such materials are usually referred to as curing agents but at times are designated as hardeners, activators or catalysts. While some curing agents promote curing by catalytic action; others participate directly in the reaction and are absorbed into the resin chain. Depending upon the particular agent used, the curing may be accomplished at room temperature, with heat produced by exothermic reaction or by the application of external heat. Obviously, some of these agents are more suitable than others for a particular purpose; for example, certain liquid curing agents are suitable for improving the fluidity of the compositions as well as for performing the curing or hardening function.

Numerous examples of curing agents, which are known to those skilled in the art for curing epoxide resins and which may be used with the compositions of this invention, are for example various amines such as aliphatic and aromatic primary, secondary and tertiary amines, e.g. diethylamine, mono-, di- and tri-butylamines, octylamine, dodecylamine, cyclohexylamine, benzylamine, benzyl dimethylamine, piperidine, piperazine, etc.; polyamines, e.g. m-phenylene diamine, p-phenylene diamine, 4,4'-methylene dianiline, m-xylene diamine, 4,4'-diaminodiphenyl sulfone, 4,4'-methylene dianiline-diaminodiphenyl sulfone blend, m-phenylene diamine-diaminodiphenyl sulfone blend, ethylene diamine, N,N-diethylene diamine, diethylene triamine, triethylene tetramine, tetraethylene pentamine, pentaethylene diamine, etc.; oxy-amines such as ethanolamine, butanolamine, diethanolamine, triethanolamine, etc.; hydroxy-alkylated polyamines, such as 2-aminoethylethanolamine, N-hydroxyethyl-1,2-diamino propane, 1,3-diaminopropanol, N - hydroxypropyl - m - phenylene diamine, N-(2 - hydroxypropyl) - ethylene diamine, N,N'-bis(hydroxyethyl) triethylene triamine, N-(hydroxyethyl) diethylene triamine, etc.; aliphatic amine-adducts such as diethylene triamine, 4,4'-isopropylene diphenol adduct, diethylene triamine/acrylonitrile adduct, acrylonitrile/tetraethylene pentamine adduct, etc.; cyanamide and its polymerization products, e.g. dicyandiamine; alcoholates of polyvalent metals, such as aluminum butylate, ferric butylate, and the like; amide type curing agents, including primary carboxylic acid amides and polyfunctional carboxylic acid amides, e.g. acetamide, adipamide, benzamide, diacetamide of hexamethylene diamine, monoamides of the type described in U.S. 2,760,944, sulfonamides of the type described in U.S. 2,712,001, etc.; polyamides, e.g. the polyamide resins sold by General Mills under the Versamid trademark, which may be used in such quantities that they function as flexibilizing modifiers, etc.; organic and inorganic acids and anhydrides, e.g. citric acid, acetic acid, aconitic acid, oxalic acid, succinic acid, succinic anhydride, dodecylsuccinic anhydride, lactic acid, maleic acid, maleic anhydride, fumaric acid, phthalic acid, phthalic anhydride, pyromellitic dianhydride, hexachloroendomethylene tetrahydrophthalic anhydride, hexahydrophthalic anhydride, methyl endomethylene tetrahydrophthalic anhydride, 1,2,4-butanetricarboxylic acid, isophthalic acid, terephthalic acid, acetoacetic acid, malonic acid, sulfonic acids, such as benzenesulfonic acid, phosphinic acids such as dibenzenephosphonic acid, and the like; the boron trifluoride complexes such as the p-cresol and urea complexes, diethylaniline-boron trifluoride complex, monoethylamine-boron trifluoride complex, etc.; and metal containing organic and inorganic compounds as zinc fluoborate, potassium persulphate, nickel fluoborate, copper fluoborate, sellenium fluoborate, magnesium fluoborate, tin fluoborate, potassium perchlorate, cupric sulfate, cupric phosphate, cupric phosphite, cobaltous fluoborate, cobaltous fluosilicate, chromic sulfate, chromic sulfite, lead arsenite, lead borate, lead molybdate, magnesium sulfate, cadmium arsenate, cadmium silicate, silver chlorate, silver fluosilicate, strontium chlorate, aluminum phosphate, aluminum fluoborate, ferrous silicate, manganese hypophosphite, nickel phosphate, and nickel chlorate.

The polyamine curing agents and the polycarboxylic acid anhydride curing agents are especially useful in the epoxide compositions of this invention.

A good many of the above listed curing agents are liquids and, as mentioned above, can serve the dual role of improving the fluidity and effecting cure. Some of these which are particularly useful in such a dual role are liquid polyamines, e.g. tetraethylene pentamine. It is often advantageous to use mixtures of different curing agents, sometimes a liquid and a solid agent or two liquid or two solid curing agents.

Effective concentrations of curing agents in the epoxy resin compositions of this invention vary in wide ranges depending on the particular epoxide and curing agent selected and the desired rate of cure. For the catalytic type curing agents the amount employed will usually vary from about 1 to about 20 parts per 100 parts by weight of the epoxide and more preferably from 1 part to 5 parts per 100 parts of the epoxide. It is generally suitable to use up to about 50 parts per 100 parts of epoxide of a polycarboxylic acid or anhydride, while in the case of an amine or amide type, from about 5 to about 20 parts per 100 parts by weight of epoxide are generally used. With the cross-linking amines, the customary method is to allow one epoxy group for each active hydrogen of the amine curing agent. Since the phosphorus containing modifier of this invention acts as a partial replacement for the amine curing agent, it is preferred to use less than a stoichiometric amount. Note for example, that with tetraethylenepentamine it is only necessary to use 8 phr. (parts per hundred parts of epoxide resin) of the amine when 25 phr. of diphenyl phenylphosphonite is present, as contrasted with 12 phr. when no phosphonite is present. Hence one-half of one gram mole of phosphonite replaces one gram mole of active hydrogen.

Various other ingredients may be mixed with the compositions of the present invention, including pigments, colors, fillers, resin stabilizers, flexibilizing modifiers, and the like.

To illustrate the manner in which the invention is carried out, the following examples are given. It is to be understood, however, that the examples are for the purpose of illustration and the invention is not to be regarded as limited to any specific conditions recited therein. Unless otherwise specified, parts disclosed in the following examples are parts by weight.

EXAMPLE 1

The formulations listed below are prepared by adding the indicated amounts of the phosphorus acid ester and the curing agent to 100 parts of Epon 828 (glycidyl polyether of bis(4-hydroxyphenyl)-2,2-propane), manufactured by the Shell Chemical Company. The resulting mixture is agitated thoroughly, poured into an aluminum mold (⅛" deep) coated with a standard mold release agent (Mold Release 225 manufactured by the Garan Chemical Corporation), and then cured for one-half hour at 100° C. The hardness is then measured using a standard instrument manufactured by the Shore Instrument Company. In some cases the viscosity is measured after mixing the three components to demonstrate the viscosity reduction attained in using this phosphorus acid ester reactive diluent. The compositions and the results obtained are reported in the Tables A and B, respectively.

It should be noted that the alcohol moieties of the phosphorus acid esters of Formulations 2, 3, 4, and 5 are derived from alcohols having an acid dissociation constant ($Ka$) which is above $1 \times 10^{-13}$. For example, phenol has a $Ka$ value of $1.3 \times 10^{-10}$ and thiophenol has a $Ka$ value of $1 \times 10^{-7}$. From the results obtained it is evident that neutral esters of a trivalent phosphorus acid, which has at least one carbon to phosphorus bond, provide especially valuable epoxide resin compositions.

Compositions having similarly improved physical properties are prepared by replacing the phosphorus acid ester component of Formulations 2, 3, 4 or 5 with substantially the same amount of diphenyl 3,5-dimethylphenylphosphonite, bis(2,4-dichlorophenyl) 2,4-dichlorophenylphosphonite, O-phenyl S-cresyl chloroethylphosphonothioite, phenyl (2-ethylhexyl) phenylphosphinite, diphenyl β-naphthylphosphonite, diphenyl benzylphosphonodithioite, dixylyl nonylphenylphosphonothioite, α-naphthyl phenyloctylphosphinite, phenyl diallylphosphinite, ethylene phenylphosphonite, ortho-phenylene phenylphosphonite, O-phenyl allyl benzylphosphinite and bis(2,2,2-trichloroethyl) phenylphosphonite, bis(2,2,2-trifluoroethyl) phenylphosphonite, phenyl (hydrogen) phenylphosphonite, and cresyl (hydrogen) phenylphosphonodithioite.

Similar results are obtained when the amine curing agent of Formulations 2, 3, 4 or 5 is replaced by a chemically equivalent amount of diethylene triamine, n-phenylene diamine, 4,4'-methylene dianiline, benzyl dimethylamine (cure at 150° C. for 2 hours), hexachloroendomethylene tetrahydrophthalic anhydride and phthalic anhydride. With the last two curing agents it is necessary to effect the cure at 150° C. for 16 hours.

Similar results are obtained when the epoxide resin component of Formulations 1 and 2 are replaced by a chemically equivalent amount of Epon 815 (epoxide equivalent weight=175–210), ERL–2774 (epoxide equivalent weight=185–200), Epoxide 201 (epoxide equivalent weight=ca. 140), and limonene dioxide (epoxide equivalent weight=ca. 84), in that the layup stage viscosity of

*Table A*

| Component | Formulation Number | | | | | | |
|---|---|---|---|---|---|---|---|
| | 1 | 2 | 3 | 4 | 5 | 6 | 7 |
| Epon 828 | 100 | 100 | 100 | 100 | 100 | 100 | 100 |
| Tetraethylene pentamine | 8 | 8 | 8 | 8 | 8 | 8 | 8 |
| Diphenyl phenylphosphonite | | 25 | | | | | |
| Dicresyl phenylphosphonodithioite | | | 25 | | | | |
| Phenyl diphenylphosphinite | | | | 25 | | | |
| Diphenyl chloromethylphosphonite | | | | | 25 | | |
| Dibutyl phthalate | | | | | | 25 | |
| 2-Ethylhexyl diphenylphosphate | | | | | | | 25 |

*Table B*
SHORE HARDNESS "B" SCALE

| Form No. | ½ Hr. at 100° C. | 19 Hrs. at 100° C. | Viscosity (Layup Stage) Cps.[1] |
|---|---|---|---|
| 1 | 85 | | 5,800 |
| 2 | 89 | 99 | 1,380 |
| 3 | 81 | 97 | 1,500 |
| 4 | 89 | | 1,820 |
| 5 | 90 | | 800 |
| 6 | 10 | 48 | 1,550 |
| 7 | 5 | 38 | 1,300 |

[1] Brookfield spindle No. 4 at 60 r.p.m.

Referring now to Table B, it should be noted that the viscosities of the epoxide compositions containing the phosphorus acid ester are appreciably lower than the controls. This viscosity reduction is obtained without an adverse effect on the hardness of the cured product. The results obtained with Formulations 6 and 7, which contain conventional non-reactive diluents, effectively demonstrate the poor results obtained when using such diluents.

the epoxide composition containing the diphenyl phenylphosphonite is substantially lower than the unmodified composition and the physical properties of the cured epoxide composition are substantially the same or superior to the unmodified epoxide resin composition.

EXAMPLE 2

One hundred parts of an epoxide resin having an epoxide equivalent weight of 175–210 (Epon 828) are mixed with 25 parts of diphenyl phenylphosphonite and 3 parts of benzyl dimethyl amine. The resulting mixture is then coated on a glass plate and completely cured by heating at 150° C. for 1½ hours. After cooling, the resulting coated glass plate is then tested for adhesion of the coating by immersion in water, dilute alkali solutions and organic solvents, such as ketone and ethyl alcohol, for a period of four days. On removal from these liquids, the glass plate is dried and examined. The film does not whiten or soften and the adhesion is not impaired as the result of the extended immersion in the above liquids.

Similar results are obtained when the diphenyl phenyl phosphonite of this example is replaced by the following compounds: dicresyl phenylphosphonodithioite, phenyl diphenyl phosphinite, diphenyl chloromethylphosphonite, bis(2,2-trichloroethyl) phenylphosphonite, diphenyl β-chloroethylphosphonodithioite, and α-naphthyl 2 ethylhexylphenylphosphonite.

EXAMPLE 3

A mixture of 100 parts of diphenyl phenylphosphonite and 100 parts of Epon 1004 (epoxide equivalent weight 870–1025) are dissolved in 225 parts of methylethyl ketone. To this solution is added 8 parts of tetraethylene pentamine. Films of 0.205 inch thickness, baked for approximately 1 hour at 100° C., give flexible, infusible products.

Similar results are obtained when the diphenyl phenyl phosphonite of this example is replaced by the following compounds: dicresyl phenylphosphonodithioite, phenyl diphenylphosphinite, diphenyl chloromethylphosphonite, bis(2,2-trichloroethyl) phenylphosphonite, diphenyl β-chloroethylphosphonodithioite, and α-naphthyl 2 ethylhexylphenylphosphonite.

EXAMPLE 4

A hardenable, filling composition is prepared by mixing 400 parts of Epon 828 and 350 parts of diphenyl phenylphosphonite. To this is added 200 parts of calcium carbonate, 30 parts of wood flour and 32 parts of tetraethylene pentamine. The mixture is then passed through a three-roll paint mill until a homogeneous product of smooth consistency is obtained. The resulting product cures completely to a solid homogeneous state without undergoing any substantial volume shrinkage upon heating at 150° C. for two hours.

Examples of suitable formulations combined in a way similar to that in the preceding example include:

EXAMPLE 5

| | Parts |
|---|---|
| Epoxide resin (glycidyl polyether of bis(4-hydroxyphenyl)-2,2-propane epoxy (equivalent weight=175–210) | 600 |
| Kaolin | 50 |
| Calcium carbonate | 100 |
| Titanium dioxide | 25 |
| Phthalic anhydride | 100 |
| m-Phenylene diamine | 50 |
| Diphenyl phenylphosphonite | 100 |
| Diallyl cresylphosphonite | 75 |

EXAMPLE 6

| | |
|---|---|
| Epoxide resin (glycidyl polyether of bis(4-hydroxyphenyl)-2,2-propane epoxy (equivalent weight=450–525) | 400 |
| Kaolin | 230 |
| Asbestos fibers | 40 |
| Maleic anhydride | 50 |
| Mono-hydroxyethyldiethylenetriamine | 35 |
| Butyl diphenylphosphinite | 200 |

EXAMPLE 7

| | |
|---|---|
| Epoxide resin (glycidyl polyether of bis(4-hydroxyphenyl)-2,2-propane, epoxy (equivalent weight=225–290) | 400 |
| Calcium carbonate | 80 |
| Titanium dioxide | 40 |
| Methylene dianiline | 36 |
| Dibutyl 2-ethylhexylphosphonite | 50 |

EXAMPLE 8

As further illustrative of this invention, compositions comprising respectively

| | 1 | 2 | 3 | 4 |
|---|---|---|---|---|
| Epon 828 | 100 | 100 | 100 | 100 |
| Diphenyl phenylphosphonite | | 25 | | 25 |
| Diethylene triamine | 12 | 8 | 12 | 8 |
| Versamide 125 [1] | 100 | 100 | | |
| Thiokol LP-3 [2] | | | 100 | 100 |

[1] A polyamide modifier manufactured by General Mills, Inc.
[2] A polysulfide modifier manufactured by Thiokol Chemical Corporation.

are prepared by mixing the epoxide resin with the respective ingredients in the amounts set forth above. The resulting mixture is then agitated thoroughly, poured into an aluminum foil mold and then allowed to cure for seven days. Formulations 1 and 3 (containing the flexibilizing modifiers without the diphenyl phenylphosphonite) are extremely viscous and difficult to pour, whereas Formulations 2 and 4 can be readily poured. In addition to the layup stage viscosity improvements, the flexibility characteristics (including the ability of the cured resin to retain the flexibility) is not adversely affected by the incorporation of the diphenyl phenylphosphonite.

The compositions of this invention comprising an epoxide resin and a neutral ester of a trivalent phosphorus acid, containing at least one carbon to phosphorus bond (a phosphorus acid ester), may be prepared, as indicated by the foregoing examples, simply by admixing the several components. In general, the separate components may be admixed in any desired order and, if desired, combinations of two or more of the components (if there are more than two) may be prepared initially and any remaining components added subsequently. When a curing agent is to be incorporated, it may be desirable to add this component just prior to use, particularly if the curing agent renders the composition readily curable at or near room temperatures. In the case of certain phosphorus acid esters, it may be desirable to warm the phosporus acid ester-epoxide resin mixture to effect complete solution thereof. Thereafter, however, the mixture may be cooled to room temperature and still remain homogeneous. In still other cases it may be desirable to add another component, e.g., a liquid curing agent, to effect the complete solution of the component.

Phosphorus acid esters contemplated herein which have a high degree of aromaticity generally admix at room temperature to form homogeneous mixtures, i.e., the two components are completely miscible with each other without the application of heat.

While in general it is desirable that the compositions comprising the epoxide resin and the phosphorus acid ester be homogeneous, i.e., form a single phase, useful products can be obtained even though the phosphorus acid ester is not completely in solution, particularly when the composition is to be heat hardened in the form of a thin film or is so formulated as to cure rapidly and before appreciable coalescence of any dispersed phase can occur.

It will be appreciated by those skilled in the art that the choice and amount of the various components of the compositions of the invention will be subject to adjustment and correlation, and thusly, will depend on the use for which the composition is intended and the result desired, e.g., the type and amount of epoxide resin, the phosphorus acid ester, curing agent, if any, etc. These factors in turn are subject to adjustment and correlation with the procedure for preparing the complete compositions, e.g., order of mixing, etc.

Generally, amounts of phosphorus acid ester in the range of 5 to 150 parts per 100 parts by weight of epoxide resin may be used, however, amounts above or below may be used where desired, e.g., from about 2 to about 200. Amounts in the range from about 5 to about 40 parts of phosphorus acid ester give particularly desirable results in most applications.

In some cases it may be desirable to include conventional non-volatile solvents or liquid reactive solvents, such as those previously mentioned depending on the properties desired in the final product. Thus, such materials may serve to impart homogeneity to the mixture of epoxide resin and the phosphorus acid ester when these two components are not completely miscible with each other and homogeneity is desired. However non-volatile components used in the compositions of the invention which are miscible with the epoxide resin-phosphite ester mixture, e.g. components other than miscible fillers and coloring materials, are usually present in minor amounts and the epoxide resin-phosphorus acid ester mixture is predominant in amount, i.e. amounts to more than 50% by weight of the total and preferably 75–100% by weight of the total of the sum of the epoxide resin, the phosphorus acid ester and other non-volatile miscible components.

For certain applications, e.g., surface coating, the mixture can be dissolved in solvents, such as toluene, acetone, methylethyl ketone, dioxane, ethylene dichloride, butyl acetate, propylene oxide, etc.

The new epoxide compositions, made with phosphorus acid esters in suitable proportions, form valuable protective layers and films when used either as clear varnishes or as pigmented varnishes, enabling infusible films to be obtained, which possess remarkable chemical resistance and other desirable properties, including high adherence to glass, plastics, ceramics, metal, and other hard-to-coat surfaces. Thus, they are useful in the lamination of wood to form plywood, in metal lamination, and, particularly so, in glass lamination where the clarity of the adhesive is critical.

These compositions are also useful in impregnating wood and fabrics and in making self-sustaining films and filaments.

Since the compositions of the present invention possess remarkable electrical properties in addition to extremely low volume shrinkage, high chemical and moisture resistance, high flexibility and good structural strength, they are especially useful as filling compositions for potting and casting applications, as in casting small transformers and in casting leads. The compositions are also useful as oil seals and as insulation for motor windings.

While this invention has been described with respect to certain embodiments, it is not so limited and it is to be understood that variations and modifications thereof may be made without departing from the spirit or scope of this invention.

What is claimed is:

1. An improved epoxide composition suitable for use in forming cured resinous products comprising an epoxide resin containing at least one 1,2-epoxy group, a curing agent for said epoxide resin and from about 2 to about 200 parts by weight per 100 parts by weight of resin of a phosphorus acid ester having the structure:

$$(R)_n\text{---}P\text{---}(X\text{---}R')_{3-n}$$

wherein $n$ is an integer of from 1 to 2, X is a divalent chalkogen atom having an atomic weight of less than 35, and R and R' are selected from the group consisting of aromatic, aliphatic and cycloaliphatic hydrocarbon radicals and the halogenated, alkoxy and hydroxy substituted derivatives of such aromatic, aliphatic and cycloaliphatic hydrocarbon radicals, provided that when $n=1$ then one R' radical may be a hydrogen atom.

2. A composition of claim 1 wherein the epoxide resin is a glycidyl polyether of a dihydric phenol and wherein the moiety (R'—X—) of the phosphorus acid ester is derived from a compound having an acid dissociation constant above about $1 \times 10^{-13}$.

3. A composition of claim 2 wherein the phosphorus acid ester is diphenyl chloromethyl phosphonite.

4. A composition of claim 2 wherein the phosphorus acid ester is phenyl diphenylphosphinite.

5. An improved epoxide composition suitable for use in forming cured resinous products comprising a glycidyl polyether of a dihydric phenol containing at least one 1,2-epoxy group, a curing agent for said glycidyl polyether and from about 5 to about 150 parts by weight per 100 parts by weight of resin of a phosphorus acid ester having the structure:

$$(R)_n\text{---}P\text{---}(OR')_{3-n}$$

wherein $n$ is an integer of from 1 to 2 and R and R' are aryl radicals having from six to fifteen carbon atoms.

6. An improved epoxide composition suitable for use in forming cured resinous products comprising a glycidyl polyether of bis(4-hydroxyphenyl)-2,2-propane containing at least one 1,2-epoxy group, a curing agent for said glycidyl polyether and from about 5 to about 40 parts by weight per 100 parts by weight of resin of a phosphorus acid ester having the structure:

$$R\text{---}P\begin{matrix}O\text{---}R'\\O\text{---}R'\end{matrix}$$

wherein R and R' are aryl hydrocarbon radicals having from six to fifteen carbon atoms.

7. A composition of claim 6 wherein the glycidyl polyether has an epoxide equivalent weight of from about 175 to 600.

8. A composition of claim 6 wherein the glycidyl polyether has an epoxide equivalent weight of from about 175 to 220.

9. A composition of claim 6 wherein the phosphorus acid ester is diphenyl phenylphosphonite.

10. A composition of claim 9 in which the curing agent is a polyamine.

11. A composition of claim 9 in which the curing agent is a polycarboxylic acid anhydride.

12. The product obtained by curing a mixture comprising an epoxide resin containing at least one 1,2-epoxy group, a curing agent for said epoxide resin and from about 2 to about 200 parts by weight per 100 parts by weight of resin of a phosphorus acid ester having the structure:

$$(R)_n\text{---}P\text{---}(XR')_{3-n}$$

wherein $n$ is an integer of from 1 to 2, X is a divalent chalkogen atom having an atomic weight less than 35, and R and R' are selected from the group consisting of aromatic, aliphatic and cycloaliphatic hydrocarbon radicals and the halogenated, alkoxy and hydroxy substituted derivatives of such aromatic, aliphatic and cycloaliphatic hydrocarbon radicals, provided that when $n=1$ then one R' radical may be a hydrogen atom.

13. A product of claim 12 wherein the epoxide resin is a glycidyl polyether of a dihydric phenol and wherein the moiety (R'—X—) of the phosphorus acid ester is derived from a compound having an acid dissociation constant above about $1 \times 10^{-13}$.

14. The process for preparing a cured epoxide resin composition which comprises mixing a glycidyl polyether of a dihydric phenol containing at least one 1,2-epoxy group, a curing agent for said glycidyl polyether and from about 5 to about 150 parts by weight per 100 parts by weight of resin of a phosphorus acid ester having the structure:

$$(R)_n\text{---}P\text{---}(OR')_{3-n}$$

wherein $n$ is an integer of from 1 to 2 and R and R' are aryl radicals having from six to fifteen carbon atoms, and thereafter curing the mixture.

15. The product obtained by curing a mixture of a glycidyl polyether of a dihydric phenol containing at least one 1,2-epoxy group, a curing agent for said glycidyl polyether, and from about 5 to about 150 parts by weight per 100 parts by weight of resin of a phosphorus acid ester having the structure:

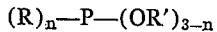

wherein $n$ is an integer of from 1 to 2 and R and R' are aryl radicals having from six to fifteen carbon atoms.

16. The process for preparing a cured epoxide resin composition which comprises mixing a glycidyl polyether of bis(4-hydroxyphenyl)-2,2-propane containing at least one 1,2-epoxy group, a curing agent for said glycidyl polyether and from about 5 to about 40 parts by weight per 100 parts by weight of resin of a phosphorus acid ester having the structure:

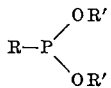

wherein R and R' are aryl hydrocarbon radicals having from six to fifteen carbon atoms, and thereafter curing the mixture.

17. The product obtained by curing the mixture comprising a glycidyl polyether of bis(4-hydroxyphenyl)-2,2-propane containing at least one 1,2-epoxy group, a curing agent for said glycidyl polyether and from about 5 to about 40 parts by weight per 100 parts by weight of resin of a phosphorus acid ester having the structure:

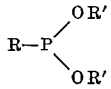

wherein R and R' are aryl hydrocarbon radicals having from six to fifteen carbon atoms.

18. A product of claim 17 wherein the phosphorus acid ester is diphenyl phenylphosphonite.

19. A product of claim 18 wherein the curing agent is a polyamine curing agent.

20. A product of claim 18 wherein the curing agent is a polycarboxylic acid anhydride curing agent.

References Cited by the Examiner

UNITED STATES PATENTS

| | | | |
|---|---|---|---|
| 2,686,771 | 8/1954 | Whitehill et al. | 260—47 |
| 2,732,367 | 1/1956 | Shokal | 260—2 |

OTHER REFERENCES

Kosolapoff: "Organophosphorus Compounds," John Wiley & Sons, Inc., New York, 1950, pp. 121, 129 and 145 particularly relied on.

WILLIAM H. SHORT, *Primary Examiner.*

HAROLD N. BURSTEIN, PHILIP E. MANGAN,
*Examiners,*

R. J. BUTTERMARK, T. D. PERWIN, A. LIBERMAN, H. D. ANDERSON, *Assistant Examiners.*